(12) United States Patent
Ceekala et al.

(10) Patent No.: US 11,470,233 B2
(45) Date of Patent: Oct. 11, 2022

(54) MULTI-CAMERA SYNCHRONIZATION THROUGH RECEIVER HUB BACK CHANNEL

(71) Applicant: TEXAS INSTRUMENTS INCORPORATED, Dallas, TX (US)

(72) Inventors: Vijaya Ceekala, San Jose, CA (US); Xin Liu, Saratoga, CA (US); Ramsin Ziazadeh, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 90 days.

(21) Appl. No.: 17/145,740

(22) Filed: Jan. 11, 2021

(65) Prior Publication Data

US 2021/0136276 A1 May 6, 2021

Related U.S. Application Data

(63) Continuation of application No. 15/910,567, filed on Mar. 2, 2018.

(60) Provisional application No. 62/587,500, filed on Nov. 17, 2017.

(51) Int. Cl.
*H04N 5/232* (2006.01)
*H04N 7/18* (2006.01)
*H04N 7/10* (2006.01)

(52) U.S. Cl.
CPC ........... *H04N 5/23203* (2013.01); *H04N 7/10* (2013.01); *H04N 7/181* (2013.01)

(58) Field of Classification Search
CPC ...... H04N 5/23203; H04N 5/232; H04N 7/10; H04N 7/181; H04N 7/18
See application file for complete search history.

(56) References Cited

U.S. PATENT DOCUMENTS

| 6,061,089 | A | * | 5/2000 | Tonkin | H04N 7/181 |
| | | | | | 348/E7.086 |
| 2005/0154736 | A1 | | 7/2005 | Meikleham | |
| 2013/0287122 | A1 | * | 10/2013 | Mizosoe | H04N 21/2365 |
| | | | | | 375/240.26 |
| 2017/0048424 | A1 | | 2/2017 | Schaffner | |

FOREIGN PATENT DOCUMENTS

JP     20011282714    10/2001

OTHER PUBLICATIONS

International Search Report in corresponding PCT Application No. PCT/US2018/061792, dated Apr. 4, 2019 (2 pages).

* cited by examiner

*Primary Examiner* — Kathleen V Nguyen
(74) *Attorney, Agent, or Firm* — John R. Pessetto; Charles A. Brill; Frank D. Cimino

(57) ABSTRACT

A driver assistance system includes a first camera, a second camera, a first serial interface circuit, a second serial interface circuit, and a hub interface circuit. The first serial interface circuit is coupled to the first camera. The second serial interface circuit is coupled to the second camera. The hub interface circuit is coupled to the first serial interface circuit and the second serial interface circuit. The hub interface circuit is configured to receive transmissions from the first serial interface circuit and the second serial interface circuit, and to transmit control information to the first serial interface circuit and the second serial interface circuit. The hub interface is also configured to encode a clock signal in the control information.

26 Claims, 2 Drawing Sheets

MULTI-CAMERA SYNCHRONIZATION THROUGH RECEIVER HUB BACK CHANNEL

CROSS REFERENCE TO RELATED APPLICATIONS

This continuation application claims priority to U.S. patent application Ser. No. 15/910,567, filed Mar. 2, 2018, which application claims priority to and the benefit of U.S. Provisional Application No. 62/587,500, filed Nov. 17, 2017, both of which are incorporated herein by reference in their entirety.

BACKGROUND

Advanced Driver Assistance Systems (ADAS) are systems that are included in automobiles and other vehicles to enhance operational safety. An advanced driver assistance system may include a variety features can provide better visibility into conditions outside the vehicle. In a multi-camera surround view systems, a multiple cameras provide video streams that are used to generate a bird-eye view of the vehicle's surroundings in real time. Such systems can be used to monitor vehicle surroundings when the driving, parking, changing lanes, etc. Such a solution helps a driver park safely by providing a view of the entire 360 degree surrounding of the vehicle.

SUMMARY

A multi-view driver assistance system and video control system suitable for use therein are disclosed herein. In one example, a driver assistance system includes a first camera, a second camera, a first serial interface circuit, a second serial interface circuit, and a hub interface circuit. The first serial interface circuit is coupled to the first camera. The second serial interface circuit is coupled to the second camera. The hub interface circuit is coupled to the first serial interface circuit and the second serial interface circuit. The hub interface circuit is configured to receive transmissions from the first serial interface circuit and the second serial interface circuit, and to transmit control information to the first serial interface circuit and the second serial interface circuit. The hub interface is also configured to encode a clock signal in the control information.

In another example, a video control system includes a hub interface circuit and a plurality of serial interface circuits. The hub interface circuit includes a clock generator and a plurality of transceivers. The clock generator is configured to synchronize a clock signal to a reference clock. Each of the transceivers is configured to communicate bidirectionally with a serial interface circuit, and to encode the clock signal in control information to be transmitted to a serial interface circuit. Each of the serial interface circuits is configured to bidirectionally communicate with the hub interface circuit. Each of the serial interface circuits includes a clock recovery circuit and a camera interface. The clock recovery circuit is configured to extract the clock signal from the control information transmitted by the hub interface circuit. The camera interface is configured to provide, to a camera, a synchronization signal generated from the clock signal extracted from the control information.

In a further example, a driver assistance system includes a hub interface circuit, a plurality of serial interface circuits, and a plurality of cameras. The hub interface circuit includes a clock generator, frame sync generation circuitry, and a plurality of transceivers. The clock generator is configured to synchronize a clock signal to a reference clock. The frame sync generation circuitry is configured to generate a frame sync signal. Each of the transceivers is configured to communicate bidirectionally with a serial interface circuit, and to encode the clock signal and the frame sync signal in control information to be transmitted to a serial interface circuit. Each of the serial interface circuits is configured to bidirectionally communicate with the hub interface circuit. Each of the serial interface circuits includes a clock recovery circuit, a clock generation circuitry, frame sync recovery circuitry, and a camera interface. The clock recovery circuit is configured to extract the clock signal from the control information transmitted by the hub interface circuit. The clock generation circuitry is configured to generate a clock based on the clock signal extracted from the control information. The frame sync recovery circuitry is configured to extract the frame sync signal from the control information. The camera interface is configured to provide the clock and the frame sync signal to a camera. Each of the cameras is coupled to one of the serial interface circuits.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

In a surround view system provided as part of an advanced driver assistance system, a bird's eye view image is stitched together from images captured by multiple cameras. In some surround view systems, the cameras operate asynchronously. An image processor buffers frames of the asynchronously acquired video and stiches frame data together to form the surround view image. Such systems include substantial frame memory and each camera includes independent timing circuitry.

In the surround view systems disclosed herein, a hub interface circuit is connected to a number of serial interface circuits, each of serial interface circuits is interfaced to a camera. The hub interface circuit transmits timing information to the serial interface circuits. The timing information is encoded in control information transmitted to the serial interface circuits by the hub interface circuit, and includes a clock signal and a frame sync signal. The serial interface circuits recover the timing information from the transmitted control information and apply the clock and frame sync signals to synchronize image acquisition by the cameras and transfer of the image data to the hub interface circuit. Because the timing of the cameras and the serial interface circuits is derived from signals transmitted by the hub interface circuit, implementations of the serial interface circuits include no crystal timing reference. Because the image data acquired by the cameras and transferred to the hub interface circuit is synchronized using the timing information provided the hub interface circuit, the amount of frame memory included in an image processor, and latency in producing a surround view image is substantially reduced.

Figure 1:
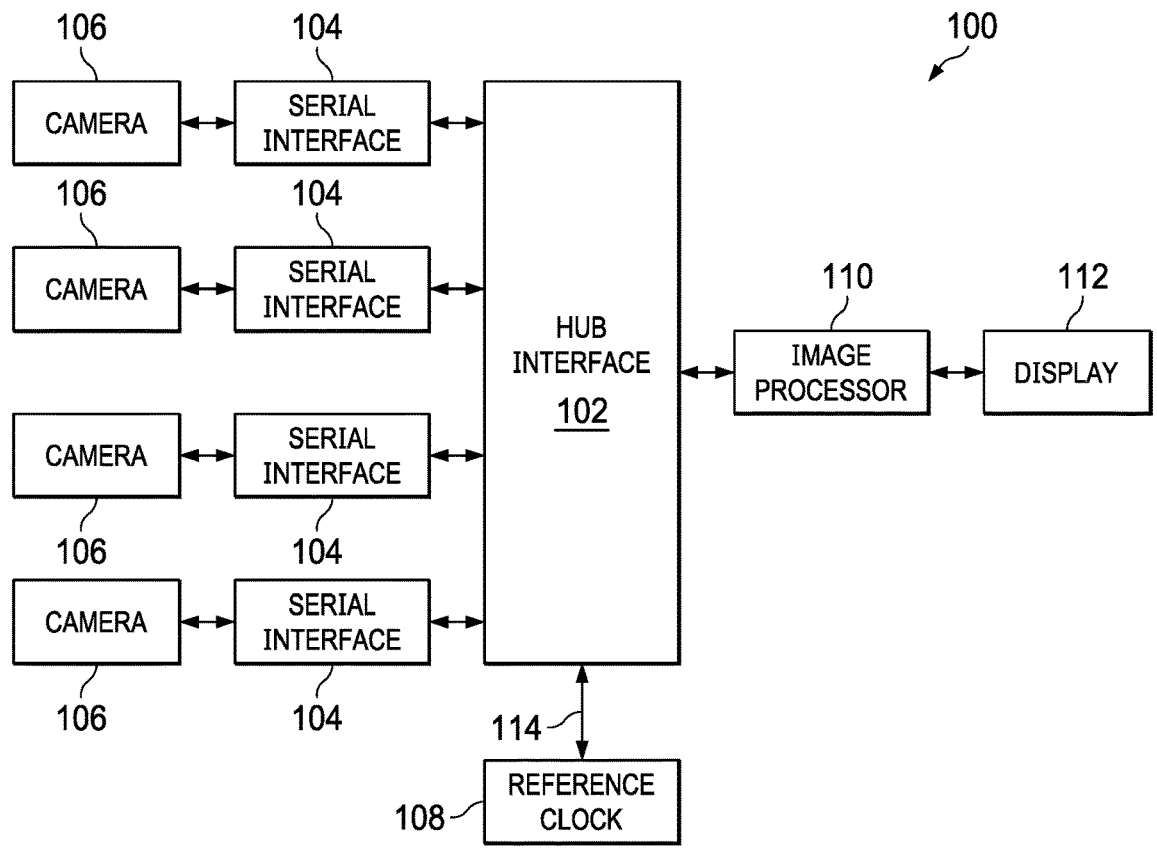
FIG. 1 shows a block diagram for an example of a surround view system of an Advanced Driver Assistance Systems in accordance with the present disclosure.

FIG. 1 shows a block diagram for an example of a surround view system 100 of an Advanced Driver Assistance System in accordance with the present disclosure. The surround view system 100 includes a hub interface circuit 102, a plurality of serial interface circuits 104, a plurality of cameras 106, a reference clock circuit 108, an image processor 110, and a display 112. In an Advanced Driver Assistance System, each of the cameras 106 is disposed to capture an image of a different side of a vehicle. For example, a first camera 106 is disposed to capture an image of a view from a front side of the vehicle, a second camera 106 is disposed to capture an image of a view from a back side of the vehicle, a third camera 106 is disposed to capture an image of a view from a driver side of the vehicle, and a fourth camera 106 is disposed to capture an image of a view from a passenger side of the vehicle. Each of the cameras 106 is coupled to one of the serial interface circuits 104. Each of the serial interface circuits 104 is coupled to the hub interface circuit 102 via a coaxial cable, a shielded twisted pair, or other signal conductor. The serial interface circuits 104 receive video data from the cameras 106 and transfer the video data to the hub interface circuit 102. The serial interface circuits 104 also transfer control signals to the cameras 106. For example, the serial interface circuits 104 transfer synchronization signals, such as clock and frame sync signals to the cameras 106.

The hub interface circuit 102 is coupled to the image processor 110, and transfers the video data received from the serial interface circuits 104 to the image processor 110 for processing and display. For example, some implementations of the hub interface circuit 102 interleave lines or frames of video data received from the serial interface circuits 104 and transfer the interleaved video data to the image processor 110. The image processor 110 includes a processor, such as a general-purpose microprocessor, a digital signal processor, a graphics processing unit, or other device configured to process image data. The image processor 110 combines the video data received from the serial interface circuits 104 to form a composite image that simulates the view of a camera positioned above the vehicle. The image processor 110 is coupled to the display 112. The composite image produced by the image processor 110 is displayed on the display 112. The display 112 is a liquid crystal device, an organic light emitting diode device, or any other device suitable for producing a viewable image.

The reference clock circuit 108 provides a reference clock to the hub interface circuit 102. For example, an implementation of the reference clock circuit 108 includes a crystal frequency reference or other reference frequency source that controls a frequency of the reference clock provided to the hub interface circuit 102. The hub interface circuit 102 applies the reference clock signal to generate timing information that is transferred to the serial interface circuits 104 by the hub interface circuit 102. The timing information includes frame synchronization information and clock timing information.

The hub interface circuit 102 communicates with the serial interface circuits 104 via a forward channel and a back channel. The forward channel carries image data from the serial interface circuits 104 to the hub interface circuit 102. The back channel carries control information from the hub interface circuit 102 to the serial interface circuits 104, and carries status information from the serial interface circuits 104 to the hub interface circuit 102. The hub interface circuit 102 encodes the frame synchronization information and the clock timing information in the control information carried on the back channel. The serial interface circuits 104 recovers the clock timing information from the control information received from the hub interface circuit 102, and applies the clock timing information to synchronize the timing of the serial interface circuits 104 and the cameras 106. The serial interface circuits 104 recover the frame sync information from the control information received from the hub interface circuit 102, and apply the frame sync information to synchronize the acquisition of image frames in the cameras 106, and synchronize the timing of image frame transfer from the serial interface circuits 104 to the hub interface circuit 102.

Because the serial interface circuits 104 apply the clock timing information and the frame sync information recovered from the control information received from the hub interface circuit 102 to synchronize image acquisition in the cameras 106 and image transfer to the hub interface circuit 102, the amount of frame buffer memory included in the image processor 110 is reduced. Because the image data received from the serial interface circuits 104 is synchronized, the image processor 110 need not wait for asynchronous image data from the cameras 106, and as a result, the time needed by the image processor 110 to produce a composite image based on images captured by the cameras 106 (e.g., a surround view image) is reduced.

Figure 2:
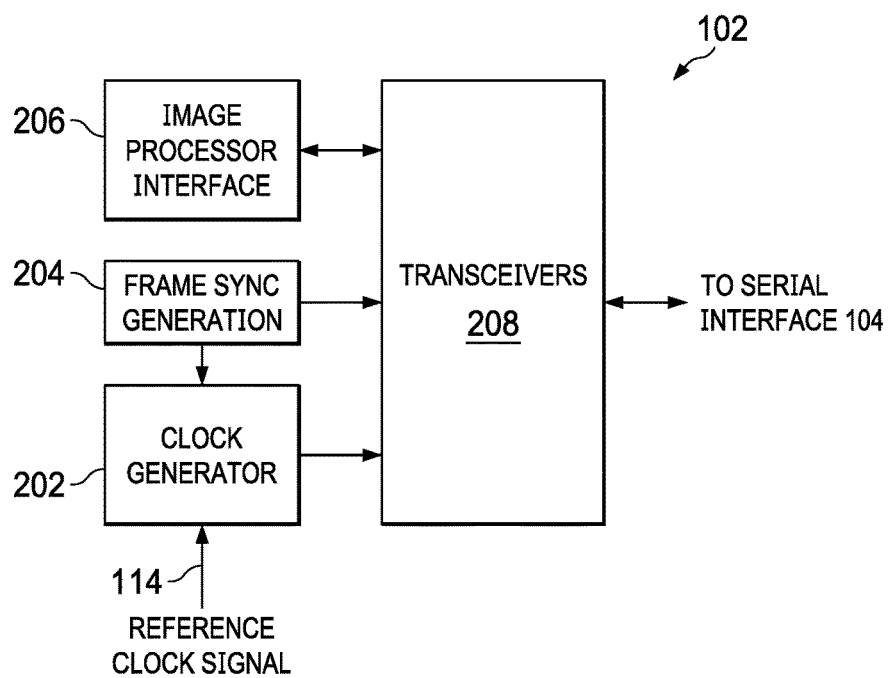
FIG. 2 shows a block diagram for an example of a hub interface circuit for use in a surround view system in accordance with the present disclosure.

FIG. 2 shows a block diagram for an example of a hub interface circuit 102 in accordance with the present disclosure. The hub interface circuit 102 includes a clock generation circuit 202, a frame sync generation circuit 204, an image processor interface 206, and transceivers 208. Some implementations of the hub interface circuit 102 include a transceiver 208 for bidirectional communication with each of the serial interface circuits 104. For example, to interface with four serial interface circuits 104, the hub interface circuit 102 includes four transceivers 208. In some implementations of the hub interface circuit 102, the transceivers 208 include circuitry for providing serial communication with the serial interface circuits 104 via a coaxial cable, a shielded twisted pair, or other signal conductor. For example, a forward channel receiver of the transceiver 208 is to receive image data transmitted by a serial interface circuit 104, and a back channel transmitter of the transceiver 208 is to transmit control data, including the frame sync information and the clock timing information, to the serial interface circuit 104.

The clock generation circuit 202 includes circuitry to generate clock signals. For example, an implementation of the clock generation circuit 202 includes phase locked loop circuitry or other frequency synthesis circuitry that produces a selected clock frequency based on the reference clock signal 114 provided by the reference clock circuit 108. The clock generation circuit 202 generates a clock signal that is provided to the transceivers 208 for communication to the serial interface circuits 104. The transceivers 208 encode the clock signal in the control information transmitted to the serial interface circuits 104 by the transceivers 208. For example, the some implementations of transceivers 208 provide transitions in the control information transmitted to the serial interface circuits 104 at a frequency related to the clock signal. The clock generation circuit 202 also provides a clock signal to the frame sync generation circuit 204.

The frame sync generation circuit 204 includes circuitry to generate a frame sync signal based on the clock signal received from the clock generation circuit 202. The frame sync signal specifies the timing of image capture by the cameras 106, and of image transfer from the serial interface circuits 104 to the hub interface circuit 102. The frame sync signal generated by the frame sync generation circuit 204 is provided to the transceivers 208 for communication to the serial interface circuits 104. The transceivers 208 encode the frame sync signal in the control information transmitted to the serial interface circuits 104 by the transceivers 208. For example, some implementations of the transceivers 208 provide transitions in the control information transmitted to the serial interface circuits 104 at a frequency corresponding to the frame sync signal.

The image processor interface 206 includes circuitry for communicating with the image processor 110. For example, the image processor interface 206 includes circuitry that transfers image data received from the serial interface circuits 104 to the image processor 110. In some implementations, the image processor interface 206 implements a camera serial interface specified by the Mobile Industry Processor Interface Alliance (MIPI CSI-2).

The hub interface circuit 102 may include additional circuitry that has been omitted from FIG. 2 in the interest of clarity. For example, some implementations of the hub interface circuit 102 include a control interface (e.g., an inter-integrated circuit interface) via which the hub interface circuit 102 receives information, from a device external to the hub interface circuit 102, to be transferred to the serial interface circuits 104 via the transceivers 208, and via which status received from the serial interface circuits 104 is transferred to a device external to the hub interface circuit 102.

Figure 3:
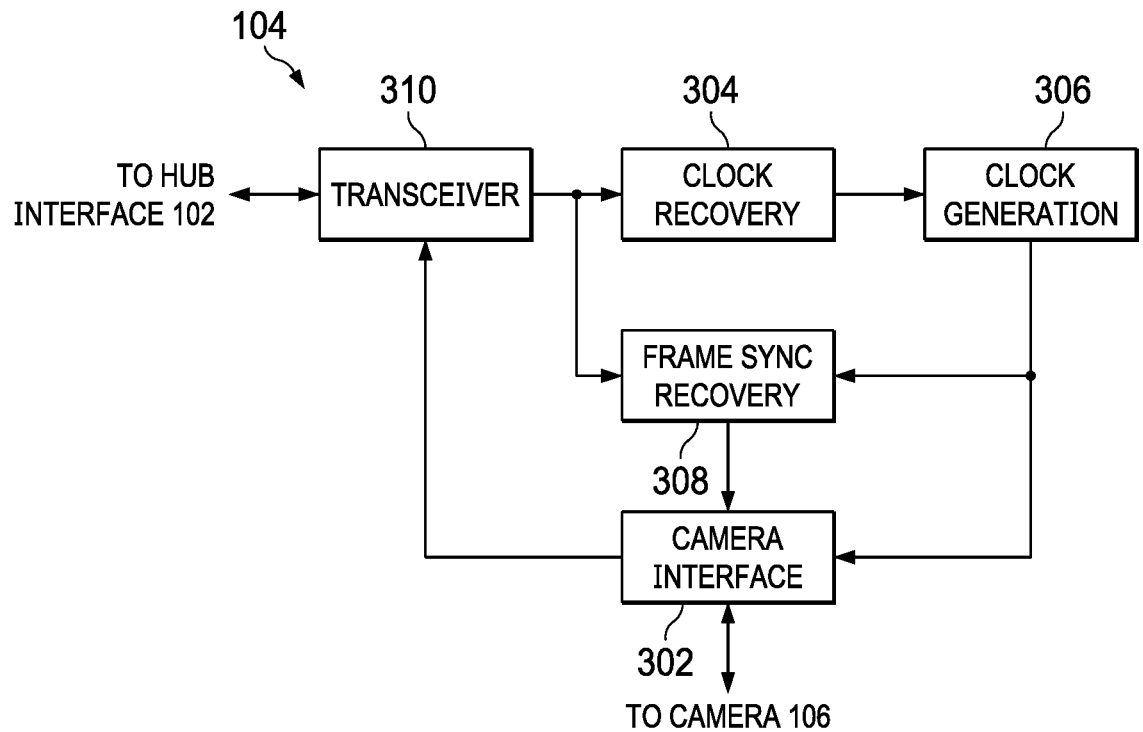
FIG. 3 shows a block diagram for an example of a serial interface circuit for use in a surround view system in accordance with the present disclosure.

FIG. 3 shows a block diagram for an example of a serial interface circuit 104 in accordance with the present disclosure. The serial interface circuit 104 includes camera interface circuitry 302, clock recovery circuitry 304, clock generation circuitry 306, frame sync recovery circuitry 308, and a transceiver 310. The transceiver 310 includes circuitry that bidirectionally communicates with the transceiver 208. In some implementations, the transceiver 310 includes circuitry to communicate with the transceiver 208 via a coaxial cable, shielded twisted pair, or other signal conductor. For example, a forward channel transmitter of the transceiver 310 is to transmit image data to the hub interface circuit 102, and a back channel receiver of the transceiver 310 is to receive control data, including the frame sync information and the clock timing information, transmitted by the hub interface circuit 102.

The clock recovery circuitry 304 is coupled to the transceiver 310, and includes circuitry to recovery the clock timing information from the control information received from the serial interface circuits 104. For example, an implementation of the clock recovery circuitry 304 includes circuitry to extract transitions or pulses from the signal transmitted on the back channel by the hub interface circuit 102. The clock recovery circuitry 304 provides signal indicative of the clock signal encoded by the hub interface circuit 102 in the back channel signal to the clock generation circuitry 306.

The clock generation circuitry 306 generates a clock signal that is synchronized to the signal extracted from the back channel signal by the clock recovery circuitry 304. In some implementations, the clock generation circuitry 306 includes phase-locked loop circuitry or other frequency synthesis circuitry that produces a clock signal that is synchronized to the clock timing information encoded in the control information received from the hub interface circuit 102. The clock signal generated by the clock generation circuitry 306 is provided to the camera interface circuitry 302 and the frame sync recovery circuitry 308. Because the serial interface circuit 104 produces clock and other timing signals from the timing information received from the hub interface circuit 102, some implementations of the serial interface circuit 104 include no crystal timing reference.

The frame sync recovery circuitry 308 includes circuitry to recover the frame sync information from the control information received by the serial interface circuit 104 from the hub interface circuit 102. For example, in some implementations a predetermined pattern of transitions in the control information received from the hub interface circuit 102 indicate frame sync timing. The frame sync recovery circuitry 308 identifies the pattern of transitions and provides the recovered frame sync signal to the camera interface circuitry 302.

The camera interface circuitry 302 includes circuitry for communication with a camera 106. For example, the camera interface circuitry 302 includes circuitry that receives image data from a camera 106 and provides synchronization signals, such as the clock generated by the clock generation circuitry 306 and the frame sync signal recovered by the frame sync recovery circuitry 308, to the camera 106. The In some implementations, the camera interface circuitry 302 implements a camera serial interface specified by the Mobile Industry Processor Interface Alliance (MIPI CSI-2). Image data received from the camera 106 by the camera interface circuitry 302 is provided to the transceiver 310 for transmission to the hub interface circuit 102.

Figure 4:
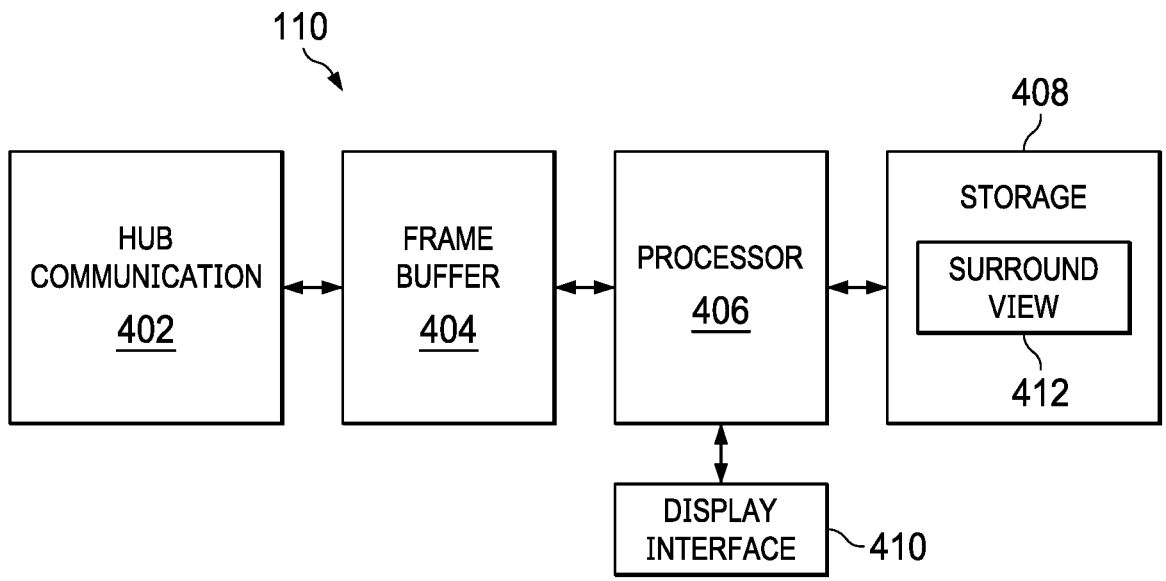
FIG. 4 shows a block diagram for an example of an image processor for use in a surround view system in accordance with the present disclosure.

FIG. 4 shows a block diagram for an example of an image processor 110 in accordance with the present disclosure. The image processor 110 includes hub communication circuitry 402, a frame buffer 404, a processor 406, storage 408, and a display interface 410. The hub communication circuitry 402 includes circuitry that provides for communication with the hub interface circuit 102. For example the hub communication circuitry 402 includes circuitry that is complementary to the circuitry of the transceivers 208 of the hub interface circuit 102. In some implementations, the hub communication circuitry 402 implements a camera serial interface as specified by the Mobile Industry Processor Interface Alliance (MIPI CSI-2).

Image data received via the hub interface circuit 102 is stored in the frame buffer 404. The frame buffer 404 includes sufficient memory to store a number of frames of video captured by each of the cameras 106. Because the video frames captured by the cameras 106 and received by the frame buffer 404 are synchronized in time, the amount of memory included in the frame buffer 404 is reduced relative to implementations that do not synchronize image capture at the clock and frame level.

The frame buffer 404 is coupled to the processor 406. In some implementations, the processor 406 is a general-purpose microprocessor, a digital signal processor, a graphics processing unit, or other device configured to process image data. The processor 406 is coupled to the storage 408. The storage 408 includes memory (e.g., volatile or non-volatile memory) that stores instructions to be executed by the processor 406. The storage includes surround view processing instructions 412. The processor 406 retrieves the surround view processing instructions 412 from the storage 408. Execution of the surround view processing instructions 412 by the processor 406 causes the processor 406 to retrieve image data from the frame buffer 404 for each of the cameras 106 and to stitch the image data together to form a composite image (e.g., a surround view image) that includes image data provided by each of the cameras 106. Because the image data from the cameras 106 is synchronized, the processor 406 need not wait for or search for time correspondent image data from each of the cameras 106, and latency in producing a composite image is reduced relative to implementations that do not synchronize image capture at the clock and frame level.

The processor 406 is coupled to the display interface 410, and the surround view processing instructions 412 cause the processor 406 to provide surround view images to the display 112 via the display interface 410. For example, some implementations of the display interface 410 serialize the surround view image data provided by the processor 406 and transmit the surround view image data to the display 112 or circuitry coupled to the display 112.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A hub interface circuit comprising:
a clock generator circuit having a first input, a second input and an output wherein the first input is coupled to a reference clock signal;
a frame sync generation circuit having a first output and a second output wherein the first output is coupled to the second input of the clock generator circuit;
an image processor interface circuit having an input and an output;
transceivers having a first input coupled to the output of the clock generator circuit, a second input coupled to the second output of the frame sync generation circuit, a third input coupled to the output of the image processor interface circuit, a fourth input coupled to a first serial interface circuit, a first output coupled to the input of the image processor interface circuit and a second output coupled to an input of the first serial interface circuit; wherein the hub interface circuit is configured to: receive transmissions from the first serial interface circuit and a second serial interface circuit; transmit control information to the first serial interface circuit and the second serial interface circuit; and encode a clock signal from the output of the clock generator circuit and a frame sync signal from the second output of the frame sync generation circuit into the control information, the frame sync signal indicative of (a) a timing of video data capture by a first camera and a second camera and (b) a time to receive the transmissions from the first serial interface circuit and the second serial interface circuit.

2. The hub interface circuit of claim 1, wherein the first serial interface circuit and the second serial interface circuit each include: a clock recovery circuit configured to extract the clock signal from the control information received from the hub interface circuit.

3. The hub interface circuit of claim 2, wherein the first serial interface circuit and the second serial interface circuit include clock generation circuitry configured to generate a clock signal based on the clock signal extracted from the control information.

4. The hub interface circuit of claim 3, wherein the first serial interface circuit and the second serial interface circuit are configured to provide a clock signal to the first camera and the second camera.

5. The hub interface circuit of claim 1, wherein the first serial interface circuit and the second serial interface circuit are configured to extract the frame sync signal from the control information.

6. The hub interface circuit of claim 5, wherein the first serial interface circuit and the second serial interface circuit are configured to provide the frame sync signal extracted from the control information to the first camera and the second camera.

7. The hub interface circuit of claim 6, wherein the first serial interface circuit and the second serial interface circuit are configured to transmit video data to the hub interface circuit, the video data comprising video frames synchronized to the frame sync signal extracted from the control information.

8. A receiver comprising:
a first input for receiving a clock signal;
a second input for receiving a frame sync signal;
a third input for receiving transmissions from a serial interface circuit;
wherein the receiver is configured to:
receive transmissions from the serial interface circuit;
encode the clock signal and the frame sync signal into control information, the frame sync signal indicative of (a) a timing of video data capture by a camera and (b) a time to receive the transmissions from the serial interface circuit.

9. The receiver of claim 8, wherein the serial interface circuit includes a clock recovery circuit configured to extract the clock signal from the control information received from the receiver.

10. The receiver of claim 9, wherein the serial interface circuit includes clock generation circuitry configured to generate a clock signal based on the clock signal extracted from the control information.

11. The receiver of claim 10, wherein the serial interface circuit is configured to provide a clock signal to the camera.

12. The receiver of claim 8, wherein the serial interface circuit is configured to extract the frame sync signal from the control information.

13. The receiver of claim 12, wherein the serial interface circuit is configured to provide the frame sync signal extracted from the control information to the camera.

14. A transmitter comprising:
a first output for transmitting control information;
a second output coupled to an image processor interface circuit;
wherein the transmitter is configured to:

transmit control information to a serial interface circuit wherein the control information is an encoding of a clock signal and a frame sync signal indicative of (a) a timing of video data capture by a camera and (b) a time to receive the transmissions from the serial interface circuit.

15. The transmitter of claim 14, wherein the serial interface circuit includes a clock recovery circuit configured to extract the clock signal from the control information received from the transmitter.

16. The transmitter of claim 15, wherein the serial interface circuit includes clock generation circuitry configured to generate a clock signal based on the clock signal extracted from the control information.

17. The transmitter of claim 16, wherein the serial interface circuit is configured to provide a clock signal to the camera.

18. The receiver of claim 14, wherein the serial interface circuit is configured to extract the frame sync signal from the control information.

19. The receiver of claim 18, wherein the serial interface circuit is configured to provide the frame sync signal extracted from the control information to the camera.

20. A transceiver comprising:
a first input for receiving a clock signal;
a second input for receiving a frame sync signal;
a third input for receiving transmissions from a serial interface circuit;
a first output for transmitting control information;
a second output coupled to an image processor interface circuit;
wherein the transceiver is configured to:
receive transmissions from the serial interface circuit;
transmit control information to the serial interface circuit; and
encode the clock signal and the frame sync signal into the control information, the frame sync signal indicative of (a) a timing of video data capture by a camera and (b) a time to receive the transmissions from the serial interface circuit.

21. The transceiver of claim 20, wherein the serial interface circuit includes a clock recovery circuit configured to extract the clock signal from the control information received from the transceiver.

22. The transceiver of claim 21, wherein the serial interface circuit includes clock generation circuitry configured to generate a clock signal based on the clock signal extracted from the control information.

23. The transceiver of claim 22, wherein the serial interface circuit is configured to provide a clock signal to the camera.

24. The transceiver of claim 20, wherein the serial interface circuit is configured to extract the frame sync signal from the control information.

25. The transceiver of claim 24, wherein the serial interface circuit is configured to provide the frame sync signal extracted from the control information to the camera.

26. The transceiver of claim 25, wherein the serial interface circuit is configured to
transmit video data to a hub interface circuit, the video data comprising video frames synchronized to the frame sync signal extracted from the control information.

* * * * *